United States Patent [19]

Kabele et al.

[11] E Re. 30,709

[45] Reissued Aug. 18, 1981

[54] METHOD OF REMOVING IMPURITIES AND SIMILAR MATTER FROM STAPLE FIBRES IN RINGLESS SPINNING AND DEVICE FOR PERFORMING SAID METHOD

[75] Inventors: Stanislav Kabele; Ctibor Doudlebsky; Frantisek Jaros; Zdenek Svec; Bohumir Brozek, all of Usti nad Orlici, Czechoslovakia

[73] Assignee: Vyzkumny Ustav Bavlnarsky, Usti nad Orlici, Czechoslovakia

[21] Appl. No.: 794,237

[22] Filed: May 5, 1977

Related U.S. Patent Documents

Reissue of:

[64] Patent No.: 3,777,466
Issued: Dec. 11, 1973
Appl. No.: 36,883
Filed: May 13, 1970

U.S. Applications:

[63] Continuation of Ser. No. 541,412, Jan. 16, 1975, abandoned.

[30] Foreign Application Priority Data

May 16, 1969 [CS] Czechoslovakia ..... 3496/69

[51] Int. Cl.[2] ..... D01H 1/12

[52] U.S. Cl. ..... 57/58.95; 57/301

[58] Field of Search ..... 57/58.89–58.95, 57/56, 156

[56] References Cited

U.S. PATENT DOCUMENTS

| | | | |
|---|---|---|---|
| 3,339,359 | 9/1967 | Ripka et al. | 57/58.89 |
| 3,360,917 | 2/1968 | Kubovy et al. | 57/56 X |
| 3,360,918 | 1/1968 | Doudlebsky et al. | 57/58.95 |
| 3,439,488 | 4/1969 | Bucil et al. | 57/58.95 |
| 3,487,626 | 1/1970 | Rajnoha et al. | 57/58.95 X |

FOREIGN PATENT DOCUMENTS

| | | | |
|---|---|---|---|
| 702713 | 1/1954 | United Kingdom | 57/58.95 |
| 880239 | 10/1961 | United Kingdom | 57/58.89 |

*Primary Examiner*—Donald Watkins
*Attorney, Agent, or Firm*—Michael J. Striker

[57] ABSTRACT

A method of removing impurities from staple fibres in ringless spinning and a device for performing said method. The impurities are ejected immediately after being contacted by the combing roller into a withdrawing space by the effect of the acceleration imparted thereto by said contact. Spinning units including a fibre separating mechanism and a rotary underpressure spinning chamber are employed. The inlet or the guiding walls for said impurities are directed in view of the separating roller tangentially. The withdrawing space can be connected to the central sucking device of the machine.

22 Claims, 4 Drawing Figures

Figure 1:
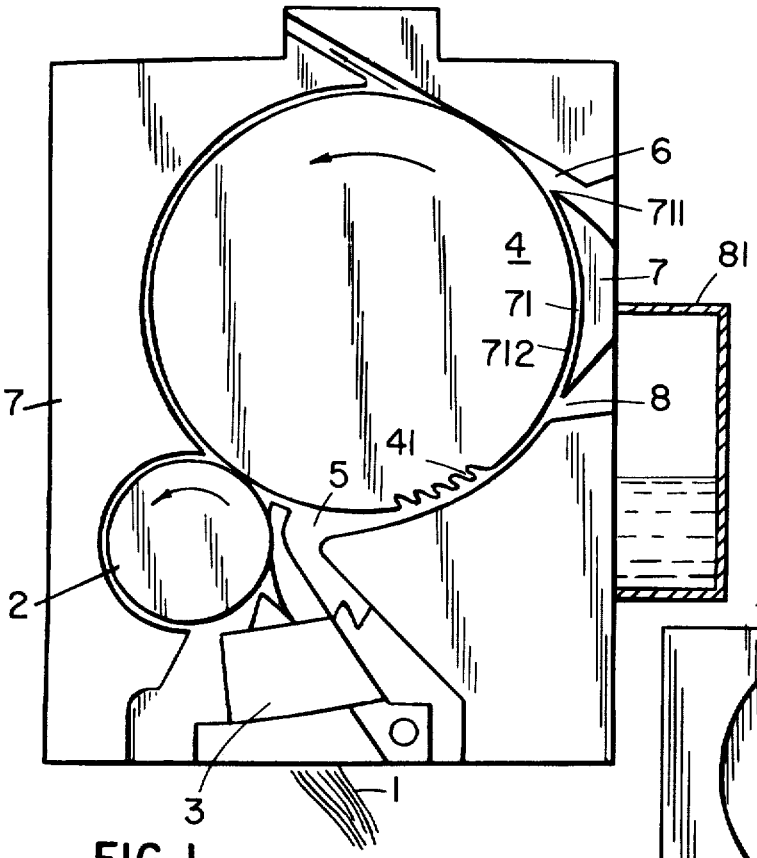

METHOD OF REMOVING IMPURITIES AND SIMILAR MATTER FROM STAPLE FIBRES IN RINGLESS SPINNING AND DEVICE FOR PERFORMING SAID METHOD

Matter enclosed in heavy brackets [ ] appears in the original patent but forms no part of this reissue specification; matter printed in italics indicates the additions made by reissue.

*This is a continuation of application Ser. No. 541,412, filed Jan. 16, 1975, now abandoned.*

The object of the present invention is a method of removing impurities and similar matter from staple fibres in ringless spinning in spinning units including a fibre separating mechanism and a rotary underpressure spinning chamber, and a device for performing said method.

In ringless spinning are various impurities, as e.g., fragments of capsules, kernels, and leaves of cotton, fibre conglomerates and peelings of synthetic fibres are the frequent reason for yarn breakage and have an unfavorable effect on the quality of the spun yarn also by causing a filling of the collecting surface of spinning chambers, thus causing a change of the values of the spun yarn, whereupon arises the necessity of removing periodically the said impurities.

The indirect influence of these impurities in the fibre material to be processed in the spindeless spinning machines is hitherto avoided by demanding a higher degree of cleanliness of the presented sliver this being connected directly with higher expenses for the preparation of the fibre sliver. Even thus it is impossible to attain a particularly favourable state.

The present invention has the purpose to remove the said disadvantages and to establish a method of and a device for enabling the spinning of fibrous materials to be processed even when lower requirements are put on the material as to the content of impurities.

The subject matter of the method according to the present invention consists in that the impurities are ejected immediately after being contacted by the combing roller into a withdrawing space by the effect of the acceleration imparted thereto by said contact.

The subject matter of the device for performing said method consists in that the inlet into the withdrawing space is made in the wall of the hollow of the body of the fibre separating mechanism which is situated oppositely to the operating part of the combing (fibre separation) roller, in the section between the separating zone and the passage of the hollow into the exit channel. It is advantageous according to the present invention when the inlet is directed at least approximately tangentially in view of the fibre separating roller.

According to the present invention, at least approximately tangentially directed guiding surfaces can be arranged at the inlet, or said inlet can be constituted by channels arranged behind each other.

An embodiment is advantageous, in which the width of the inlet is equal at least to the width of the operating part of the fibre separating roller.

From the viewpoint of attendance, an embodiment is favourable, in which the withdrawing space is connected to the central sucking device of the machine.

Figure 4:
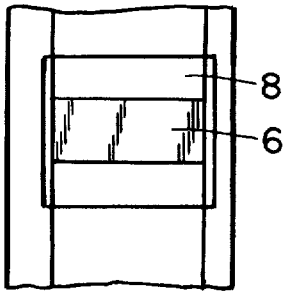
Figure 3:
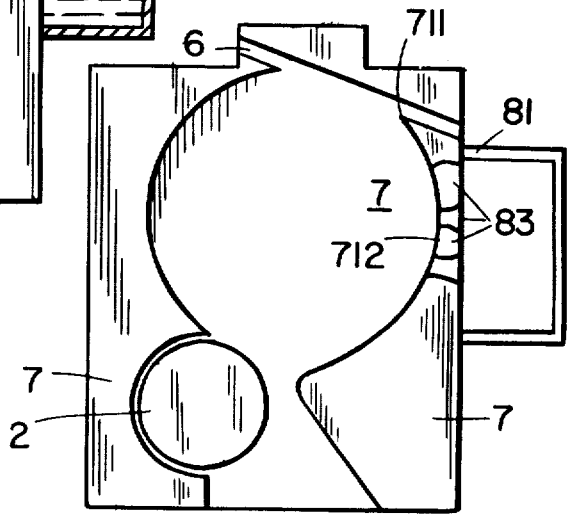
Figure 2:
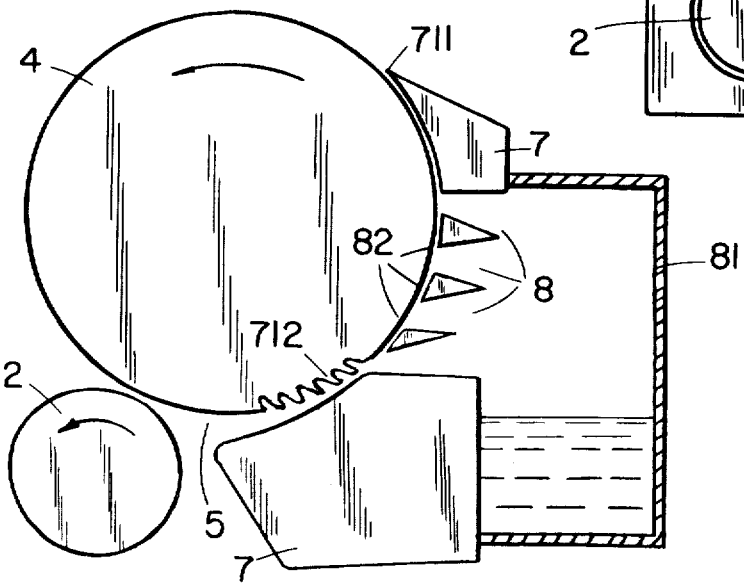

Embodiments in form of example according to the present invention are diagrammatically shown in the accompanying drawings, of which FIG. 1 represents a section through the fibre separating mechanism;

FIG. 2 an embodiment with an inlet including guiding walls;

FIG. 3 an embodiment of the inlet including channels;

FIG. 4 a view through the inlet as shown in FIG. 1, on the fibre separating roller.

The staple material 1 is fed by the feeding roller 2, and passes through the resilient condensing plate 3 to the fibre separating roller 4 which rotates at a high speed, the cylindrical operative part of said roller being provided with fibre separating tips 41. At the point of the strongest action of the fibre separating roller 4 upon the fibres of sliver 1, i.e., in the so called fibre separating zone 5, separation of fibres from the sliver 1 takes place. The said fibers combed out from the sliver 1 are brought into the exit channel 6 which debouches on the sliding wall of a not shown, known spinning chamber, in which said fibres are transformed into yarn, all this being generally known.

In the zone between the fibre separating zone 5 and the passage 711 of the hollow 71 of body 7, in which the separating roller 4 is arranged, an inlet 8 is provided in wall 712 into the withdrawing space 81, at a position opposite to the operative part of the fibre separating roller 4.

This inlet 8 has advantageously an at least approximate tangential course in view of the separating roller 4.

In the embodiment as shown in FIG. 2, tangentially arranged guiding walls 82 are mounted in the inlet 8.

In the embodiment as shown in FIG. 3, the inlet is constituted by channels 83 arranged mutually beside each other.

It is advantageously when the width of the inlet 8 is at least equal to the width of the operative part of the separating roller 4 as can be seen in FIG. 4.

The withdrawing space 81 can be emptied periodically or can be advantageously connected to the diagrammatically illustrated central sucking device of the machine (see FIG. 1).

Immediately after being contacted by the separating roller 4, the impurities as given above, which have a heavier mass than the fibres to be spun, are ejected upon action of the centrifugal force exerted by the separating roller 4 into the inlet 8, through which they are brought into the withdrawing space 81, from which they are removed either periodically or continuously by the central sucking device. Together with the mentioned impurities, also too short fibres can be removed in such manner, which would be useless as a part of the yarn to be spun.

What we claim is:

1. In a method of ringless spinning, the steps of advancing impurities-containing unopened fibers in a path leading to a spinning chamber; opening said fibers during advancement of the same so that impurities are liberated from them; continuously discharging the liberated inpurities from said path into a withdrawing space which is in open communication with said path; and continuously withdrawing the discharged impurities from said withdrawing space by suction.

2. A method as defined in claim [2] *1*, wherein the step of discharging the liberated impurities comprises accelerating the same in a direction outwardly of said path.

3. A method as defined in claim 2, wherein the step of opening said fibers comprises subjecting the fibers to the combing-out action of a carding roller.

4. In an apparatus for ringless spinning of fibers, a combination comprising fiber passage means for advancement of fibers towards a spinning chamber; supply means for supplying unopened fibers into said fiber passage means; fiber opening means for opening said fibers during advancement thereof in said fiber passage means towards said spinning chamber; impurities discharge passage means communicating with said fiber passage means for continuous discharge of impurities which are liberated from the opened fibers; and suction means in open communication with said impurities discharge passage means for continuous withdrawal from the same of discharged impurities.

5. A combination as defined in claim 4; further comprising a hollow body having said passage means formed therein; and wherein said fiber opening means comprises a fiber opening roller rotatable in said hollow body.

6. A combination as defined in claim 5, wherein said fiber passage means comprises a first passage portion extending downstream from said supply means for advancement of unopened fibers, and a second passage portion extending from said first passage portion towards said spinning chamber for advancement of opened fibers; and wherein said impurities discharge passage means communicates with said fiber passage means between said passage portions of the same.

7. A combination as defined in claim 6, wherein said impurities discharge passage means has an inlet which communicates with said fiber passage means at least substantially tangentially with reference to said fiber opening roller.

8. A combination as defined in claim 7; and further comprising tangentially oriented guide baffles mounted in said inlet.

9. A combination as defined in claim 5, wherein said impurities discharge passage means has an inlet which communicates with said fiber passage means; and further comprising guide baffles mounted in said inlet and oriented substantially tangentially with reference to said fiber opening roller.

*10. In an apparatus for ringless spinning of fibers, a combination comprising fiber passage means for advancement of fibers towards a spinning chamber; supply means for supplying unopened fibers into said fiber passage means; a fiber opening roller for opening said fibers during advancement thereof in said fiber passage means towards said spinning chamber; impurities discharge passage means communicating with said fiber opening roller for continuous discharge of impurities which are liberated from the opened fibers; and means in open communication with said impurities discharge passage means for receiving from the same the discharged impurities, said impurities discharge passage means having an inlet which communicates with said fiber passage means at least substantially tangentially with reference to said fiber opening roller.*

*11. In an apparatus for ringless spinning of fibers, a combination comprising fiber passage means for advancement of fibers towards a spinning chamber; supply means for supplying unopened fibers into said fiber passage means; a fiber opening roller for opening said fibers during advancement thereof in said fiber passage means towards said spinning chamber; impurities discharge passage means communicating with said fiber opening roller for continuous discharge of impurities which are liberated from the opened fibers; and means in open communication with said impurities discharge passage means for receiving and removing from the same the discharged impurities, said discharge passage means having an inlet which communicates with said fiber opening roller and which has guide means that are substantially tangentially oriented with reference to said fiber opening roller.*

*12. A combination as claimed in claim 11, wherein said means in open communication with said impurities discharge passage means are operatively connected to a central suction device.*

*13. In an apparatus for ringless spinning of fibers, a combination comprising supply passage means for supplying a stream of air and opened fibers to a spinning chamber; fiber passage means extending to and communicating with said supply passage means for advancing fibers to the same; supply means for supplying unopened fibers into said fiber passage means; a fiber opening roller for opening said fibers during advancement thereof in said fiber passage means towards said supply passage means; impurities discharge passage means for discharge of impurities which are liberated from the opened fibers, said impurities discharge passage means communicating with said fiber passage means closely downstream of the region where said fiber opening roller exerts its maximum opening effect upon the unopened fibers but ahead of said supply passage means so that the impurities discharge has no effect upon the flow of said stream in said supply passage means; and means communicating with said impurities discharge passage means for receiving the discharged impurities from the same.*

*14. A combination as defined in claim 13, wherein said supply passage means extends tangentially of said fiber opening roller and the opened fibers which are freed of said impurities travel with said fiber opening roller from said impurities discharge passage means to said supply passage means and are discharged into the stream of air flowing therein.*

*15. In a method of ringless spinning, the steps of guiding in a first path a stream of air which flows towards a spinning chamber; advancing impurities-containing unopened fibers in a second path which discharges into said first path; opening said fibers during advancement of the same in said second path so that impurities are liberated from the fibers; discharging the liberated impurities from said second path ahead of said first path so that the discharge has no effect upon the air stream in said first path; withdrawing the discharged impurities; and discharging the opened fibers from said second path into said first path downstream of the location where said impurities are discharged.*

*16. A method as defined in claim 15, wherein said step of opening said fibers is carried out with a rotating fiber opening roller; and wherein said stream of air in said first path flows tangentially of the periphery of said fiber opening roller and entrains the opened fibers travelling on said periphery.*

*17. In an apparatus for ringless spinning of fibers, a combination comprising supply passage means for supplying a stream of air and opened fibers to a spinning chamber; fiber passage means extending to and communicating with said supply passage means for advancing fibers to the same; supply means for supplying unopened fibers into an inlet of said fiber passage means; a fiber opening roller for opening said fibers during advancement thereof in said fiber passage means towards said supply passage means, said supply passage means being arranged to pass said stream of air by said fiber opening roller; impurities discharge passage means for discharge of impurities which are*

*liberated from the opened fibers, said impurities discharge passage means communicating with said fiber passage means intermediate said inlet and said supply passage means so that said opened fibers enter said stream of air passing by said fiber opening roller in said supply passage means only after discharge of the impurities from said opened fibers; and means communicating with said impurities discharge passage means for receiving the discharge impurities from the same.*

*18. A combination as defined in claim 17, said fiber passage means having a fiber opening zone extending from said inlet to said impurities discharge passage means, and a purified-fiber travel zone extending from said impurities discharge passage means to said supply passage means and having an outlet communicating with the latter.*

*19. A combination as defined in claim 18, said impurities discharge passage means including an inlet opening which communicates with said fiber passage means intermediate said zones thereof; and wherein said supply passage means has an air intake remote from said inlet opening for aspiration of said stream of air so that the stream sweeps over said outlet to entrain the purified opened fibers and convey them to said spinning chamber.*

*20. A combination as defined in claim 17, wherein said impurities discharge passage means includes an inlet opening communicating with said fiber passage means; and further comprising at least one guiding wall in said inlet opening and extending at least approximately tangentially of said fiber opening roller.*

*21. An apparatus for removing impurities from staple fibers for ringless spinning in spinning units, comprising a hollow body, a fiber opening roller rotatable in said hollow body, said hollow body having a supply passage through which unopened fibers are supplied to said opening roller, and a spinning chamber, said hollow body having an opened fiber discharge passage through which opened fibers pass from said opening roller to said spinning chamber, said hollow body having an impurities discharge passage between said fiber supply passage and said opened fiber discharge passage for discharge therethrough of impurities from fiber being opened by said opening roller, said impurities discharge passage extending through the hollow body generally tangentially to the periphery of the fiber opening roller.*

*22. An apparatus for removing impurities from staple fibers for ringless spinning in spinning units, comprising a hollow body, a fiber opening roller rotatable in said hollow body, said hollow body having a supply passage through which unopened fibers are supplied to said opening roller, and a spinning chamber, said hollow body having an opened fiber discharge passage through which opened fibers pass from said opening roller to said spinning chamber, and said hollow body having an impurities discharge passage between said fiber supply passage and said opened fiber discharge passage for discharge therethrough of impurities from fiber being opened by said opening roller, said impurities discharge passage extending through the hollow body generally tangentially to the periphery of the fiber opening roller, said hollow body including a wall extending substantially tangentially to the periphery of the fiber opening roller, located so that the adjacent portion of the fiber opening roller periphery moves towards said wall and constituting a wall of the impurities discharge passage.*

* * * * *